(12) United States Patent
Doolittle et al.

(10) Patent No.: US 6,729,449 B1
(45) Date of Patent: May 4, 2004

(54) DRUM BRAKE

(75) Inventors: James E. Doolittle, Granger, IN (US); William E. Sherman, II, South Bend, IN (US)

(73) Assignee: Robert Bosch Corporation, Broadview, IL (US)

( * ) Notice: Subject to any disclaimer, the term of this patent is extended or adjusted under 35 U.S.C. 154(b) by 8 days.

(21) Appl. No.: 10/249,965

(22) Filed: May 22, 2003

(51) Int. Cl.$^7$ ................................................. F16D 5/00
(52) U.S. Cl. ...................................... 188/340; 188/325
(58) Field of Search ............................ 188/206 K, 331, 188/340, 336, 342, 18 R, 234, 250 F, 250 G, 216, 196 M, 250 A, 325

(56) References Cited

U.S. PATENT DOCUMENTS

| | | | | | |
|---|---|---|---|---|---|
| 4,553,647 | A | * | 11/1985 | Spaargaren | 188/206 R |
| 4,573,557 | A | * | 3/1986 | Shellhause | 188/216 |
| 5,246,093 | A | * | 9/1993 | Wang | 188/196 M |

* cited by examiner

*Primary Examiner*—Jack Lavinder
*Assistant Examiner*—Melanie Torres
(74) *Attorney, Agent, or Firm*—Leo H McCormick, Jr.; Warren Comstock

(57) ABSTRACT

A drum brake having a disc with a peripheral surface with a plurality of radial guides interspersed between a first radial abutment and a second radial abutment. The plurality of radial guides receive a first arcuate channel member on a first brake shoe and a second arcuate channel member on a second brake to align a first reaction surface on the first channel with the first radial abutment and a second reaction surface with the second radial abutment. An actuator provides a force to move the first reaction surface moves away from the first radial abutment and the second reaction surface from the second radial abutment to initiate a brake application. When a leading edge on a first friction member frictionally contacts a braking surface on a drum the first reaction surface continues to move away from the first radial abutment while second reaction surface associated with a trailing edge is moved back into engagement with the second radial abutment to oppose the braking force developed by the frictional engagement. During the frictional engagement, the plurality of radial guides engage the first and second arcuate channels to retain the first and second friction surfaces in perpendicular alignment with the braking surface.

11 Claims, 4 Drawing Sheets

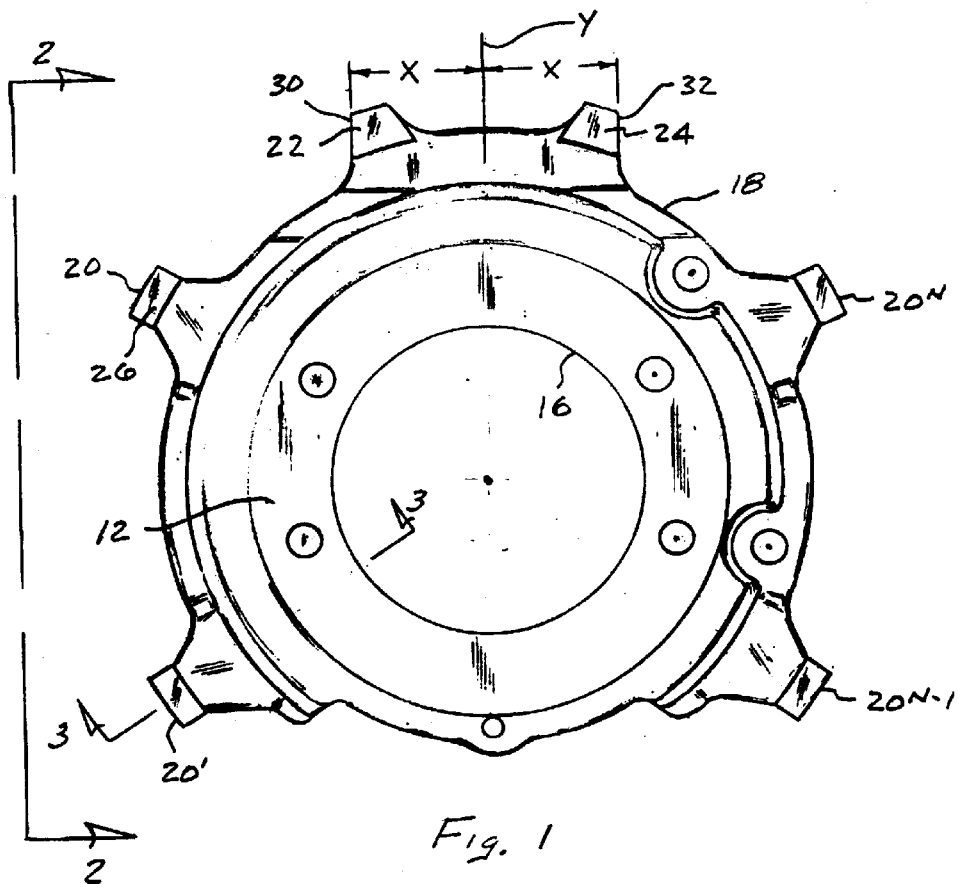
Fig. 1
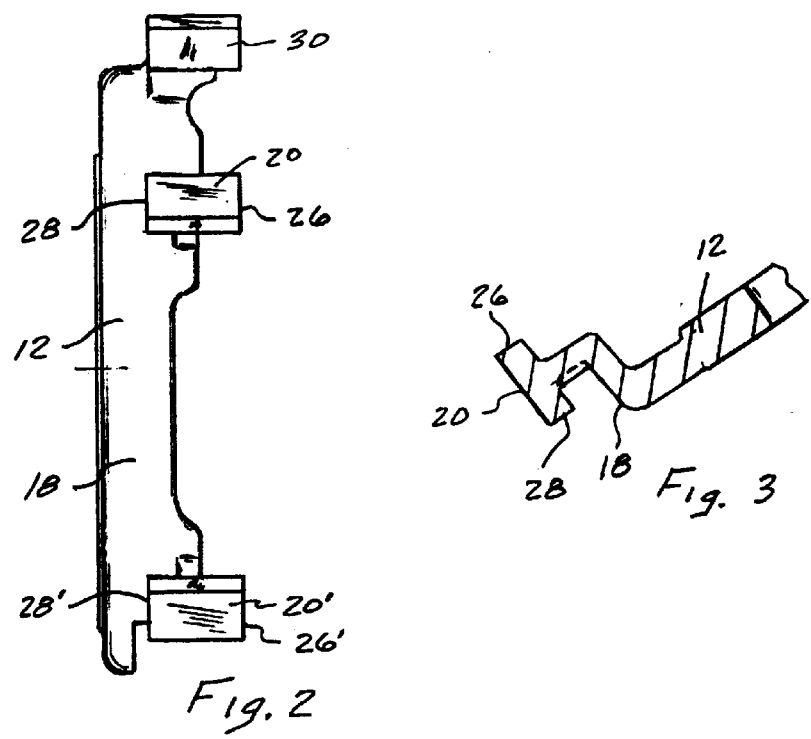
Fig. 2
Fig. 3

DRUM BRAKE

BACKGROUND OF INVENTION

It is common to provide a vehicle with a parking brake such as the drum-in-hat brake disclosed in U.S. Pat. No. 5,180,037 as many of the components derived from conventional drum brakes, such as disclosed in U.S. Pat. Nos. 3,232,391; 6,328,141 and 6,394,237. In such drum brakes the first and second brake shoes are retained on a backing plate through the use of pins that extend through the web of the brake shoes. The pins allow the brake shoes some lateral movement within a brake drum during a brake application when a leading edge of the brake shoe engages the braking surface to allow an abutment surface on a trailing edge of second to be brought in engagement with an anchor to oppose the frictional engagement. On frictional engagement it is necessary that the first and second shoes be able to move however some uneven wear patterns may occur as the webs are not held in alignment with the braking surface on the drum. U.S. Pat. No. 5,246,093 disclosed a brake wherein the web of a unitary brake shoe is retained on the backing plate by a clip member. In this brake, the friction surfaces are ground in a manner such that during a brake application the non-cylindrical surface of the friction material is expanded into a circular shape to function as a parking brake for a vehicle.

SUMMARY OF INVENTION

It is an object of this invention to provide a simple and effective drum brake wherein the friction surface on a brake pad is retained in a perpendicular alignment with a braking surface during a brake application.

According to this invention, the brake assembly for a vehicle includes a drum that is rotatable about an axis with an inner cylindrical surface defining a braking surface for first and second friction surfaces on first and second brake shoes. The first and second brake shoes are moved by an actuation member from a position of rest to bring the first and second friction surfaces into engagement with the braking surface on the drum to effect a desired brake application. The brake assembly is characterized by a disc that is fixed to the vehicle and has a peripheral surface with a plurality of radial guides interspersed between a first radial abutment and a second radial abutment. A first portion of the plurality of radial guides receive a first arcuate channel member on which the first friction surface is located to align a first reaction surface thereon with the first radial abutment. Similarly, second portion of the plurality of radial guides receive a second arcuate channel member on which the second friction surface is located to align a second reaction surface thereon with the second radial abutment. A spring located between the first and second arcuate channel members urge the first and second reaction surfaces toward the radial abutments while at the same time holding the actuation member and an adjuster arrangement in contact with the first and second arcuate channel members. To effect a brake application assuming forward motion of the vehicle, an input force is applied to the actuation member. The input force initially acts on the first channel to move the first reaction surface away from the first radial abutment and acts on the second channel to move the second reaction surface away from the second radial abutment. When a leading edge on the first friction member contacts the braking surface the first and second shoes rotate with the drum such that the first reaction surface continues to move away from the first radial abutment while the second reaction surface adjacent a trailing edge on the second friction members is brought into engagement with the second radial abutment. When the second reaction surface engages the second radial abutment the force developed by the frictional engagement of the first and second friction members with the braking surface on the drum is opposed and as a result the rotation of the drum is correspondingly reduced in effecting the brake application. The first and second arcuate channels engage the plurality of radial guides such that the first and second friction surfaces thereon are retained in perpendicular alignment with the braking surface during an entire brake application.

An advantage of this invention resides in the manner in which the friction surfaces on a brake shoe are retained in perpendicular alignment with a braking surface on a drum.

Another advantage of this invention resides in the elimination of hold down pins or clips to retain a brake shoe on a backing plate.

A further advantage of the brake shoe of this invention resided in an arcuate channel on which friction material is located such that a first end associated with a first reaction surface is identical with a second end associated with a second reaction end to assist in easy assembly on radial guides on a disc member.

A further advantage of this invention resides in a manner in which a running clearance may be adjusted to set a distance that first and second arcuate channels move to bring first and second friction surfaces into engagement in effecting a brake application.

BRIEF DESCRIPTION OF DRAWINGS

FIG. 1 is a schematic illustration of a disc having a peripheral surface with a plurality of radial guides interspersed between a first radial abutment and a second radial abutment in according to the present invention;

FIG. 2 is a side view taken along lines 2—2 of FIG. 1;

FIG. 3 is a sectional view taken along lines 3—3 of FIG. 1;

DETAILED DESCRIPTION

In the description that follows, components of the drum brake that identical may be identified by a same number plus' unless necessary to better describe a functional relationship with another component.

Figure 7:
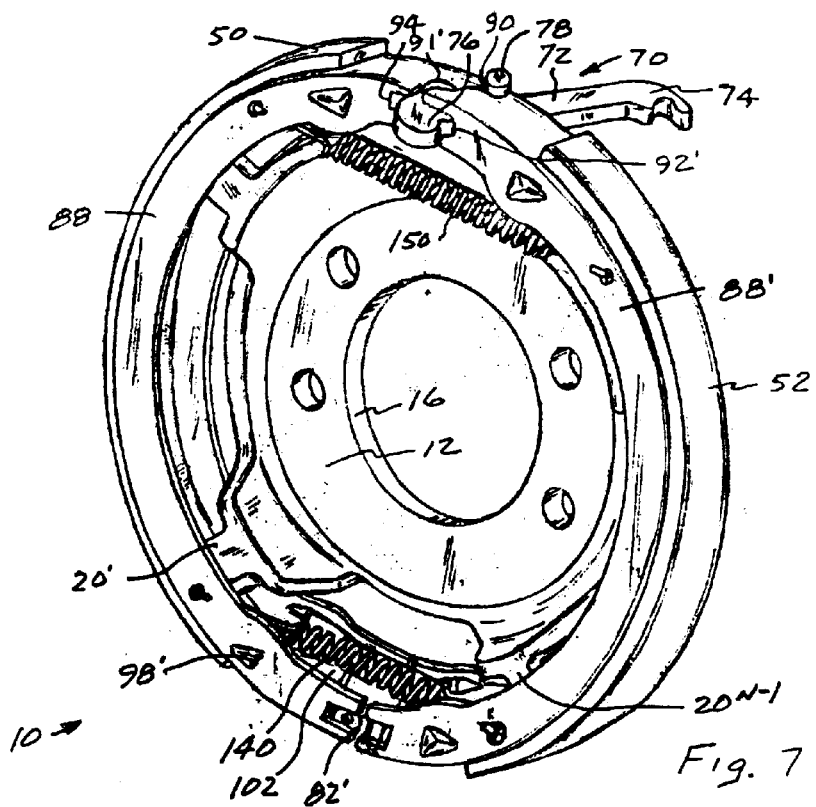
FIG. 7 is a front perspective view of a drum brake wherein the first and second arcuate brake shoes are located on the radial guides and positioned adjacent the first radial abutment and a second radial abutment of the disc of FIG. 1.
Figure 8:
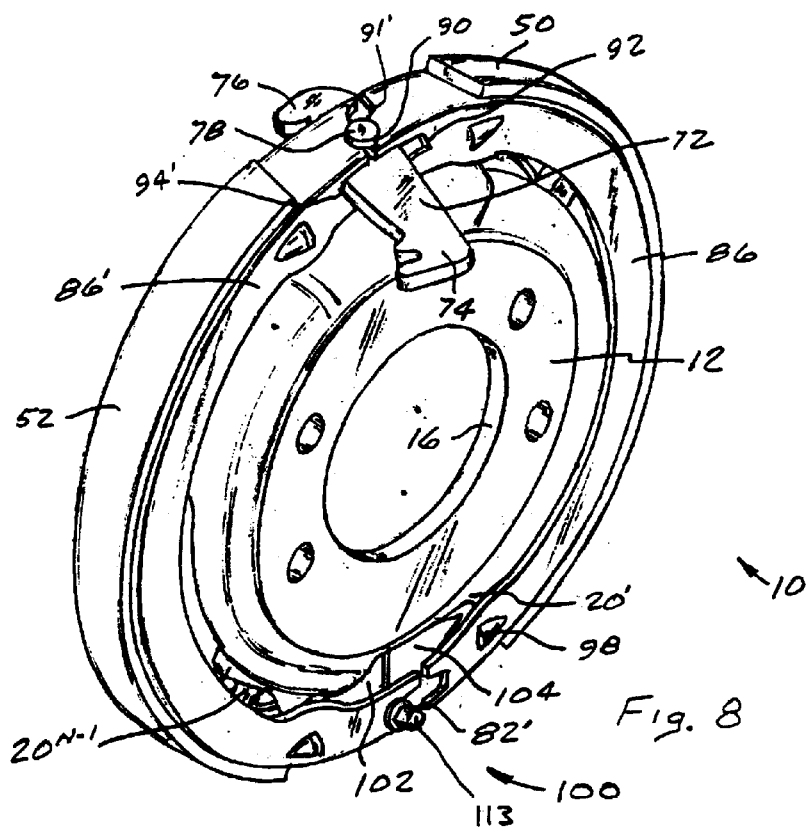
FIG. 8 is a rear perspective view of the drum brake of FIG. 7.
Figure 9:
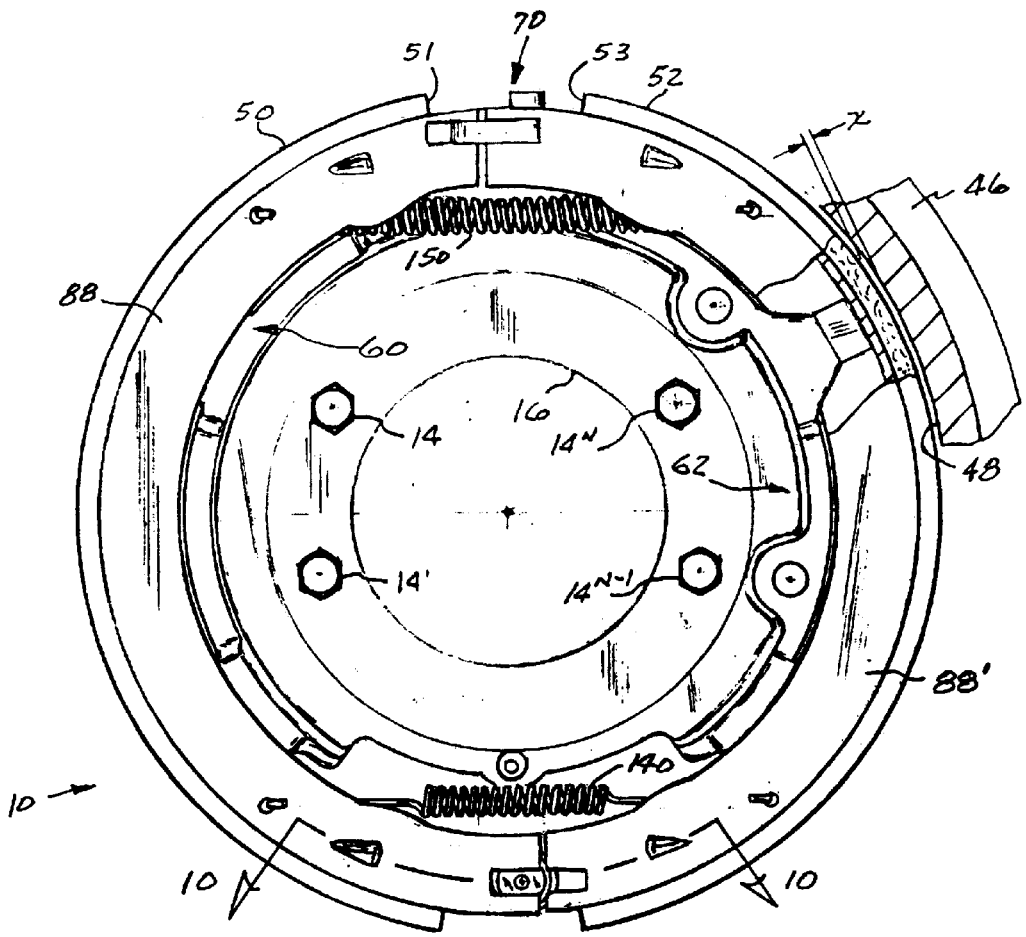
FIG. 9 is a front view of the drum brake of FIG. 7 attached to a vehicle.

The drum brake 10, as best shown in FIGS. 7, 8 and 9, is made according to the present invention and intended for use as a parking brake for a vehicle. The drum brake 10 includes a drum 46 that is rotatable about an axis of an axle shaft and has an inner cylindrical surface 48 that defines a braking surface for first 50 and second 52 friction surfaces on first 60 and second 62 brake shoes that are moved by an actuation member 70 from a position of rest to effect a desired brake application.

In more detail, the drum-in-hat brake 10 includes a disc 12 as shown in FIGS. 1, 2 and 3, that is fixed by bolts 14, 14"...14$^n$ to a vehicle. The disc 12 has an opening 16 therein through which the axle shaft passes and a peripheral surface 18 with a plurality of radial guides 20,20"...30$^n$ interspersed between a first radial abutment 22 and a second radial abutment 24. Each of the radial guides 20,20"...20$^n$ are identical and have first 26 and second 28 side walls that are parallel with the sides of disc 12 while the first 22 and second 24 radial abutments have end walls 30 and 32 that are substantially parallel with each other and to a radial plane "Y" extends from the axis of the disc 12 through a point that is equal distance "X" from each side wall. A first portion 20,20' of the plurality of radial guides 20,20"...20$^n$ receive a first arcuate channel member 80 of the first brake shoe 60 and a second portion 20$^{n-i}$, 20 of the radial guides 20,20"...20$^n$ receive a second arcuate channel member 80' of the second brake shoe 62. The radial guides 20,20"...20$^n$ engage the arcuate channels 80,80' to align the first 50 and second 52 friction surfaces with braking surface 48 on drum 46.

Figures 4, 5, 6:
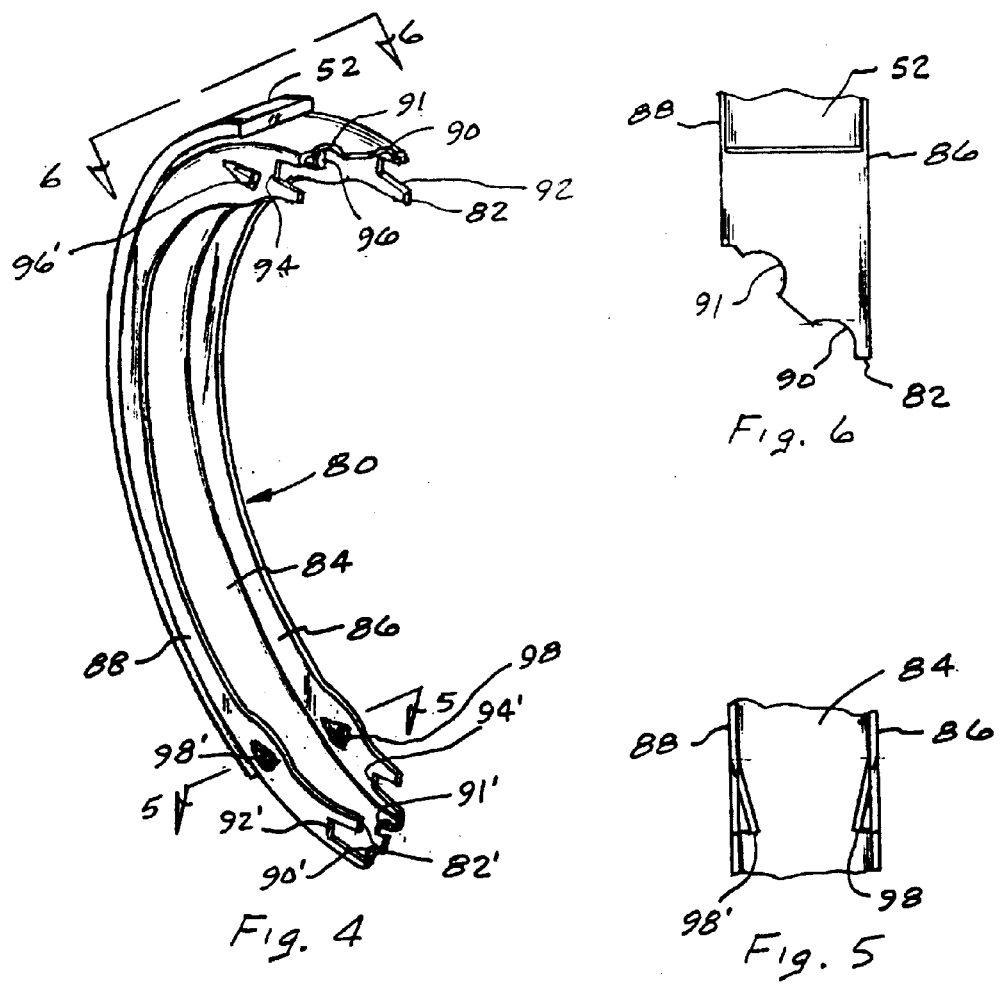
FIG. 4 is a perspective view of a brake shoe having an arcuate channel defined by a base with parallel side wall with friction material being located on the peripheral surface of the base for use in the drum brake of the present invention.
FIG. 5 is a view taken along lines 5—5 of FIG. 4 showing an end of the brake shoe.
FIG. 6 is a top view taken along lines 6—6 of FIG. 4 showing a reaction surface on the side wall of the arcuate channel.

The first and second brake shoes 60 and 62 are identical and are shown in more detail in FIGS. 4, 5 and 6. Each brake shoe 60,62 has a U shaped arcuate channel 80 defined by a base 84 and first 86 and second 88 sides that extend from a first end 82 to a second end 82'. The base 84 has a first radial indentation 90 located on the first side 86 and a second radial indentation 91 located on the second side 88 adjacent the first end 82 and a complementary first radial indentation 90' located on the second side 88 and a second radial indentation 91' on the first side 86 adjacent the second end 82'. Similarly, channel 80 has a first linear slot 92 in side 86 and a second liner slot 94 in side 88 that extends a first distance from the first end 82 and a complementary a first linear slot 92' in side 88 and a second liner slot 94' in side 86 that extends a first distance from the second end 82'. Further, the arcuate channel 80 has a first reaction surface 96,96' located in adjacent a first end 82 and a second reaction surface 98,98' located adjacent a second end 82'. As shown in FIG. 4, the resulting channel 80 for a brake shoe has no top or bottom and there is no wrong assembly when installed on disc 12.

The first 92,92' and second 94,94' linear slots in channel 80 are designed to either receive an actuator 70 or an adjuster assembly 100.

The actuator 70 is defined by a rectangular flat lever 72 with a hooked end 74 on a first end and a cam surface 76 on a second end with a pin 78 located at a desired pivot point. The flat lever 72 is respectively located in abutting linear slots 92,94 and 92', 94' in channels 80 and 80' such that pin 78 is retained between the first indentation 90 on brake shoe 60 and indentation 91' on brake shoe 62.

Figure 11:
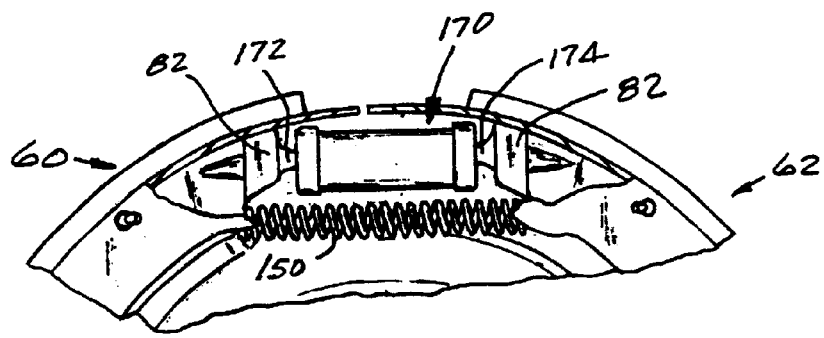
FIG. 11 is a partial view of the disc brake of this invention showing a cylinder for moving the brake shoes to effect a brake application.

In according to the invention, the lever 72 could be replaced by a cylinder 170 as shown in FIG. 11 or a solenoid, having a first end 172 could engage the first end 82 of brake shoe 60 and a second end 174 could engage the first end 82 of brake shoe 62 to effect a brake application.

Figure 10:
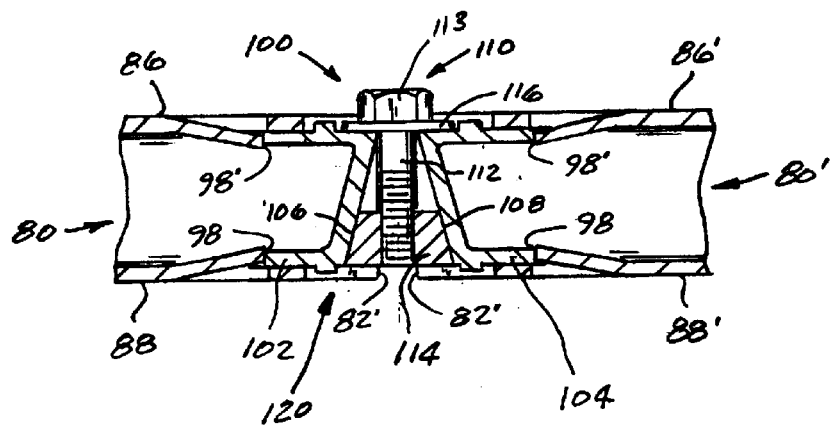
FIG. 10 is a sectional view taken along line 10—10 of FIG. 9 showing an adjuster assembly for setting a running clearance between the first and second surfaces and the brake drum.

The adjuster assembly 100, as best shown in FIG. 10, has a first end member 102 that is connected to the second end 82' of channel 80 of brake shoe 60 and a second end 104 that is connected to the second end 82' of channel 80' of brake shoe 62. The first end member 102 and the second located 104 are rectangular in shape and respectively abut the second reaction surfaces 98,98' adjacent the second end 82' of channels 80,80'. The first end member 102 has a first tapered bearing surface 106 while the second end member 104 has a second tapered bearing surface 108 such that a V shaped opening is produced between the first end member 102 and the second end member 104. A bolt 110 has a stem 112 that extends through a plate 116 that spans the sides of channels 80,80' and is connected to wedge 114 located between the first 106 and second 108 tapered surfaces to define a linkage mechanism 120 that connects the second end 82' of channel 80 and the second end 82' of channel 80'.

METHOD OF ASSEMBLY

The drum brake 10 is designed such that a portion would be assembled by a first supplier and shipped to vehicle manufacturer for installation on a vehicle. The initial subassembly of brake 10 is illustrated in FIGS. 7, 8 and 9 could be achieved through the following steps:

a disc 12 characterized by an central opening 16 and a peripheral surface 18 with a plurality of radial guides 20,20"...20$^n$ that are interspersed between a first radial abutment 22 and a second radial abutment 24 is obtained from a source of supply;

identical first 60 and second 62 brake shoe 62 having a web defined by an arcuate channel 80 are obtained from a source. The arcuate channel 80 has a base 84 and parallel first 86 and second 88 side walls that extends from a first end 82 to a second end 82' with a first reaction surface 96,96' located adjacent the first end 82 and a second reaction surface 98,98' located adjacent the second end 82'. The base 84 has a first radial indentation 90 on the first end 82 and a second radial indentation 91 on the second end 82' of first side 88. The first side 86 has a first linear slot 92 that extends a first distance from the first end 82 and the second side 88 has a second linear slot 94 that extends the same distance from the first end 82 while the first side 86 has a third linear slot 94' that extends the first distance from the second end 82' and the second side 88 has a fourth linear slot 92' that extends the first distance from the second end 82'. The first end 82 and the second end 82' are identical and as a result either end may be hereinafter installed on disc 12 without being to effectively function in effecting a brake application;

the arcuate channel 80 on the first brake shoe 60 is placed on a first portion 20,20' of the plurality of radial guides 20,20"...20$^n$ such that the first reaction surface 96,96' thereon is aligned with the first radial abutment 22;

the arcuate channel 80' on the second brake shoe 62 is placed on a second portion 20$^{n-1}$; 20$^n$ of the plurality of radial guides 20,20"...20$^n$ such that the first reaction surface 96,96' thereon is aligned with the second radial abutment 24;

an adjuster assembly 100 is obtained from a source and includes a first end member 102 that is separated from a second end member 104 by a wedge linkage mechanism 120.

the first end member 102 of the assembly 100 is located in linear slots 92', 94' in the arcuate channel 80 of the first brake shoe 60 such that the first end member 102 engages the second reaction surface 98,98' thereon;the second end 104 of the adjuster assembly 100 is located in linear slots 92',94' in the arcuate channel 80' of the second brake shoe 62 such that the second end member 104 engages the second reaction surface 98,98' thereon;

a lever 72 having a rectangular body with a hook 74 on a first end and a cam surface 76 on a second end and a pin 78 located at a desired pivot point is obtained from a source.

the lever 72 is located in the first 92 and second 94 in the first arcuate channel 80 and the first 94' and second linear 92' slots in the second arcuate channel 80' with the pin 78 being retained between indentations 90,91';

a first spring 140 and a second 150 spring are attached to wall 88 of the first arcuate channel 80 and wall 88' of the second arcuate channel 80' to urge the first ends thereon 82 toward the first 22 and second 24 radial abutments and the second end 82' toward the adjuster assembly 100 to complete the sub assembly of the first 60 and second 62 brake shoes on the disc 12.

The sub-assembled disc 12 with brake shoes 60 and 62 attached thereto is now sent to the vehicle manufacture for installation on a vehicle. As shown in FIG. 9, the disc 12 is fixed to a member on the vehicle by bolts 14,14"â14" to align axle opening with the central opening 16. A rotor which is part of a disc brake assembly is attached to an axle that extends though opening 16 such that an inner cylindrical surface defines a drum 46 with a braking surface 48 for the first 50 and second 52 friction surfaces respectively located on the first brake shoe 60 and the second brake shoe 62. After the rotor is attached to the axle, it is necessary to attach an actuation cable to the hooked end 74 of actuator lever 72 and adjust the running clearance "x" between the first 50 and second 52 friction surfaces and braking surface 48. The running clearance is adjusted by applying a torque to the head 113 of bolt 110 to rotate stem 112 and draw wedge 114 toward spacer 116 by sliding between the V shaped surfaces 106 and 108 to move the first end member 102 and the second end member 104 away from each other and correspondingly the second end 82' on the first arcuate channel 80 on brake shoe 60 and the second end 82' on the second arcuate channel 80' such that the first friction surface 50 and the second friction surface 52 are located at a desired running clearance "x".

MODE OF OPERATION

For purposes of describing the functional relationship of the components of brake 10 during a brake application it is assume that drum 46 is turning in a counter clockwise direction.

To initiate a brake application, an input force is applied to a lever 72 that is located in the first 92,92' and second 94,94' linear slots in the first 86 and, second 88 sides of the arcuate channels 80,80' such that lever 72 pivots about pin 78. Movement of the hooked end 74 of lever 72 causes cam surface 76 to engage the first end 82 of arcuate channel 80' and as a result the first ends 82 of channels 80,80' moves such that the reactions surfaces 96,96' on arcuate channel 80 to move away from the first radial abutment 22 and the reaction surfaces 96,96' on arcuate channel 80' to move away from the second radial abutment 24. When a leading edge 51 on the first friction surface 50 engages braking surface 48, the first channel 80 and second channel 80' will rotate together as a unit in the same counter clockwise direction such that the first reaction surface 96,96' on arcuate channel 80 continues to move away from the first radial abutment 22 while the first reaction surface 96,96' on arcuate channel 80' associated with a trailing edge 53 of friction surface 52, is now is returned to engagement with the second radial abutment to oppose a force generated through the engagement of the first 50 and second 52 friction surfaces with the braking surface 48 in opposing the rotation of drum 46 to effect a brake application. The plurality of radial guides 20,20"â20" engage the side walls 86,88 on the arcuate channels 80,80' to maintain a perpendicular and axial alignment between the first 50 and second 52 friction surfaces with the braking surface 48 during a brake application and as a result uniform wear is achieve on the first 50 and second 52 friction surfaces.

What is claimed is:

1. A brake assembly for a vehicle having a drum rotatable about an axis with an inner cylindrical surface defining a braking surface for first and second friction surfaces on first and second brake shoes that are moved by an actuation member from a position of rest to effect a desired brake application, said brake assembly being characterized by a disc fixed to said vehicle that has a peripheral surface with a plurality of radial guides interspersed between a first radial abutment and a second radial abutment; and in that said first brake shoe includes a first arcuate channel member with a first reaction surface located adjacent a first end and a second reaction surface located adjacent a second end and in that said second brake shoe includes a second arcuate channel member with a first reaction surface located adjacent a first end and a second reaction surface located adjacent a second end, said first arcuate channel member being positioned on a first portion of said plurality of radial guides such that said first reaction surface thereon is aligned with said first radial abutment while said second arcuate channel is positioned on a second portion of said plurality of radial guides such that said first reaction surface thereon is aligned with said second radial abutment; and in that said actuation member is located between the first end on said first arcuate channel and the first end on said second arcuate channel while a first end of an adjuster assembly is aligned with said second reaction surface on said first arcuate channel and a second end of the adjuster assembly is aligned said second reaction surface on said second arcuate channel; and spring means connected to said first arcuate channel and said second arcuate channel for urging the first ends thereon toward said actuation member and said second ends thereon toward said adjuster assembly, said actuation member on receipt of an input force acting on said first end of said first arcuate channel and said first end of said second arcuate channel to radially move said first and second friction surfaces into frictional engagement with said braking surface on said drum to effect a desired brake application, said plurality of radial guides engaging said first and second arcuate channels such that said first and second friction surfaces are retained in perpendicular alignment with said braking surface during a brake application.

2. The brake assembly as recited in claim 1 wherein engagement of said first and second arcuate channels with the plurality of guides also retains said first and second friction surfaces in axial alignment with said braking surface.

3. The brake assembly as recited in claim 2 wherein engagement of said first and second channels with said plurality of guides initially allows said first reaction surface on said first arcuate channel to move away from said first abutment and said first reaction surface on said second arcuate channel to move away from said second radial abutments as said first and second friction surfaces move toward said braking surface until engagement of a leading edge for said first and second friction surfaces with said braking surface when said first reaction surface adjacent said leading edge continues to moves further away from said first and second radial abutments while a trailing edge for said first and second friction surfaces is brought into engagement with one of the first and second radial abutment to oppose a force generated through the engagement of said first and second friction surfaces with said braking surface.

4. The brake assembly as recited in claim 3 wherein each of said first and second channels is characterized by a base with first and second sides that extend from said first end to said second end, said base having a first radial indentation on said first end adjacent said first side and a second radial indentation on said second side adjacent said second end, said first side having a first linear slot that extends a first distance from said first end and said second side having a second linear slot that extends said first distance from said first end, said first side having a third linear slot that extends a first distance from said second end and said second side having a fourth linear slot that extends said first distance from said second end.

5. The brake assembly as recited in claim 4 wherein said first end of said first channel and the first end of said second channel are characterized by receiving a lever that is located in the first and second linear slots in said first and second sides and a pin that is located between the first radial indentation in said base, said lever having a cam surface that engages one of the first ends of said first and second channels, said lever on receiving an input force pivoting on said pin to impart a corresponding actuation force through said cam surface to said one end and thereby move said first end on said first channel away from the first end on said second channel in effecting a brake application.

6. The brake assembly as recited in claim 3 wherein each of said first and second channels is characterized by a base with first and second sides that extend from said first end to said second end, said first side having a first linear slot that extends a first distance from said first end and said second side having a second linear slot that extends said first distance from said first end, said first side having a third linear slot that extends said first distance from said second end and said second side having a fourth linear slot that extends from said second end said first distance from said second end, said first linear slot receiving a first head and said second linear slot receiving a second head on a cylinder, said cylinder on receipt of an input force supplying said first head and second head with a force to move said first end on the first channel away from the first end on the second channel in effecting a brake application.

7. The brake assembly as recited in claim 4 wherein said first end of said adjuster assembly is characterized by being received by said third and fourth linear slots in said first channel and engaging said second abutment.

8. The brake assembly as recited in claim 7 wherein said second end of said adjuster assembly is characterized by being received by said third and fourth linear slots in said second channel.

9. The brake assembly as recited in claim 6 wherein said first end of said adjuster assembly is characterized by being received by said third and fourth linear slots in said first channel and engaging said second abutment while said second end of said adjuster assembly is characterized by being received by said third and fourth linear slots in said second channel.

10. A method of assembly of a drum brake comprising the steps of: obtaining a disc from a source of supply, said disc being characterized by a peripheral surface with a plurality of radial guides interspersed between a first radial abutment and a second radial abutment;

selecting a first brake shoe and a second brake shoe from a source, said first brake shoe and said second brake shoes each having a web defined by a first arcuate channel with a base and parallel first and second side wall that extends from a first end to a second end, said first arcuate channel having a first reaction surface that is located adjacent said first end and a second reaction surface that is located adjacent a second end, said base having a first radial indentation on said first end adjacent said first side and a second radial indentation on said second end adjacent said second end, said first side having a first linear slot that extends a first distance from said first end and said second side having a second linear slot that extends said first distance from said first end, said first side having a third linear slot that extends a first distance from said second end and said second side having a fourth linear slot that extends said first distance from said second end; placing said first brake shoe on a first portion of said plurality of radial guides such that said first reaction surface thereon is aligned with said first radial abutment;

placing said second brake shoe on a second portion of said plurality of radial guides such that said first reaction surface thereon is aligned with said second radial abutment;

locating a first end of an adjuster assembly in said third and fourth linear slots in said first arcuate channel such that the adjuster assembly engages said second reaction surface thereon;

locating a second end of the adjuster assembly in said third and fourth linear slots in said second arcuate channel such that the adjuster assembly engages said second reaction surface thereon;

locating a lever in said first and second linear slots in said first and second arcuate channels with a pin on said lever being located in said indentation;

attaching first and second springs to said first and second arcuate channels to urge said first ends toward said radial abutments and said second end toward said adjuster assembly to complete said assembly of the first and second brake shoes on said disc.

11. A brake assembly for a vehicle having a drum rotatable about an axis with an inner cylindrical surface to define a braking surface for first and second friction surfaces on first and second brake shoes that are moved by an actuation member from a position of rest to effect a desired brake application, said brake assembly being characterized by a disc that is fixed to said vehicle and has a peripheral surface with a plurality of radial guides interspersed between a first radial abutment and a second radial abutment, a first portion of said plurality of radial guides receiving a first arcuate channel member of said first brake shoe to align a first reaction surface thereon with said first radial abutment while a second portion of said plurality of radial guides receiving a second arcuate channel member of said second brake shoe to align a second reaction surface thereon with said second radial abutment; and in that said actuation member is located between first reaction surface and said second reaction surface such that on receipt of an input force said first reaction surface is moved away from said first radial abut ment and said second reaction surface is moved away from said second radial abutment until a leading edge on one of said first and second friction members contacts said braking surface to initiate a brake application when the reaction surface associated with the leading edge continues to move away from its radial abutment while the reaction surface associated with the trailing edge on the other of said first and second friction members is thereafter moved into engagement with its radial abutment to oppose the force developed during frictional engagement of the first and second friction members with said braking surface on said drum to effect a desired brake application, said plurality of radial guides engaging said first and second arcuate channels such that said first and second friction surfaces are retained in perpendicular alignment with said braking surface during said desired brake application.

\* \* \* \* \*